United States Patent [19]

Parker

[11] Patent Number: 4,552,491
[45] Date of Patent: Nov. 12, 1985

[54] CUTTING TOOL HAVING CYLINDRICAL CERAMIC INSERT

[75] Inventor: Frederick D. Parker, Springfield, Mass.

[73] Assignee: United Technologies Corporation, Hartford, Conn.

[21] Appl. No.: 161,825

[22] Filed: Jun. 23, 1980

[51] Int. Cl.[4] ............................................. B26D 1/00
[52] U.S. Cl. .................................. 407/107; 407/113; 407/119
[58] Field of Search .................. 407/107, 7, 103, 104, 407/113, 114, 119, 48, 62

[56] References Cited

U.S. PATENT DOCUMENTS

| 1,838,520 | 12/1931 | Archer. | |
|---|---|---|---|
| 2,289,344 | 7/1942 | Cedarleaf. | |
| 2,381,485 | 8/1975 | Chapman. | |
| 2,630,725 | 3/1953 | Black | 407/48 |
| 3,464,098 | 9/1969 | Moore et al. | 407/113 |
| 3,731,356 | 5/1973 | Gowanlock. | |
| 3,871,092 | 3/1975 | Anschutz et al. | 407/119 |
| 4,181,049 | 1/1980 | Borisenko et al. | 407/7 |

FOREIGN PATENT DOCUMENTS 239258 9/1925 United Kingdom.
607770 9/1948 United Kingdom.

OTHER PUBLICATIONS

"Ceramic Materials for Single-Point Turning Tools"; King et al., Metals Handbook Vol. III, 3rd ed. A.S.M (1963), pp. 322-324.
Greenleaf Corp. Catalog #579th; May 1979.

Primary Examiner—Leonidas Vlachos
Attorney, Agent, or Firm—C. G. Nessler

[57] ABSTRACT

A ceramic insert for a tool holder is in the shape of a tapered cylinder wherein the diameter increases outwardly along the insert length, from a first end to a second end. The second or upper end of the insert has a bevel around its circumference; the intersection of the bevel and tapered sidewall of the cylinder provide a cutting edge which has a negative rake and relief angle which are desirably constant around the insert. Thus the insert may be mounted on a neutral plane in a tool holder and a tool will cut equally well in any direction along a 180° arc. Various engagement and clamping means are used to hold the insert in place in the tool holder.

5 Claims, 9 Drawing Figures

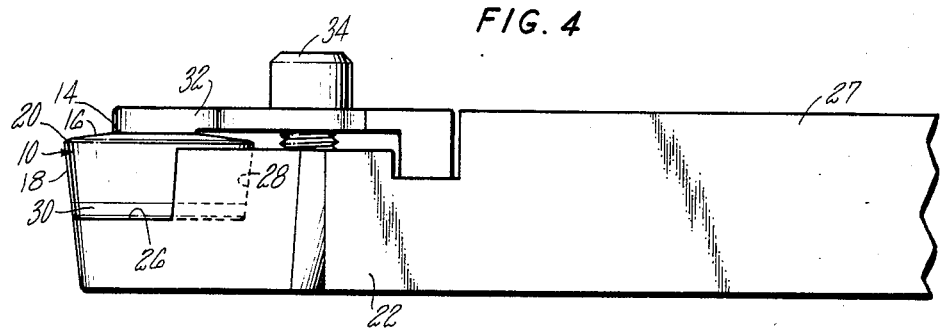
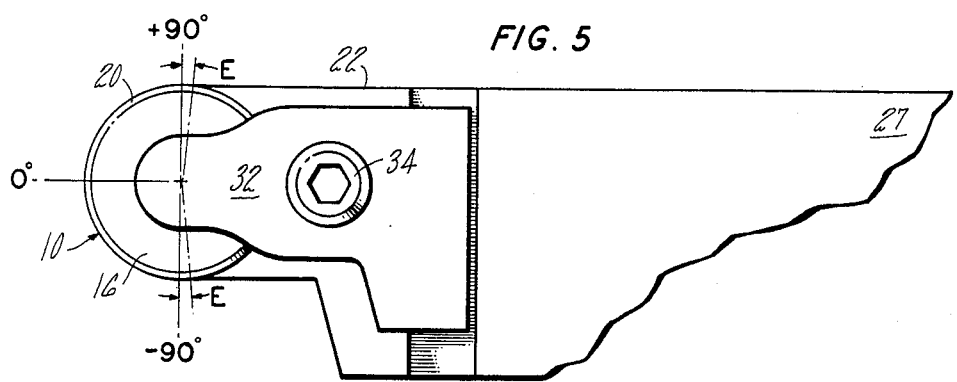
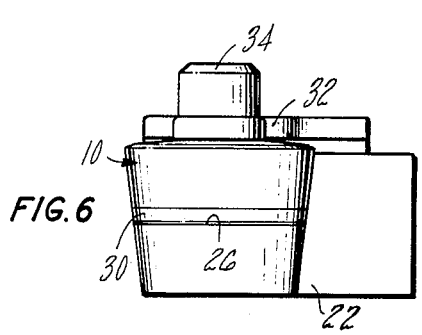
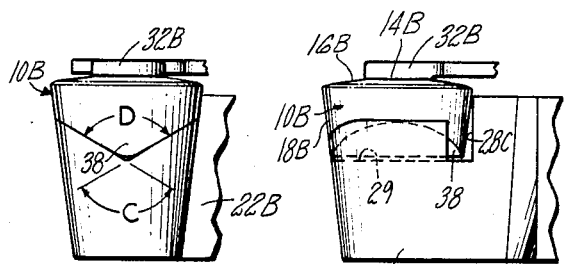
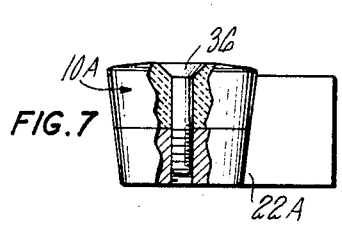

CUTTING TOOL HAVING CYLINDRICAL CERAMIC INSERT

DESCRIPTION

Background Art

1. The invention relates to single point metal cutting tools, particularly those having inserts made of ceramic materials.

2. Tool holders having mechanically clamped replaceable inserts are well known and useful because the cutting edge is readily replaceable with minimum disruption to the machine tool setup, and because a variety of materials may be substituted in the insert.

Most common inserts have been made of metal or metal-carbide combinations, but in recent years ceramic materials have been receiving more attention. While extremely hard and long wearing in certain machining applications, ceranics present special problems due to their brittleness, compared to metal-containing inserts. Most particularly, they are more prone to breakage when impact or significant deflection is encountered. Consequently many tool holders and insert designs which are usable for metal-containing inserts are not adaptable to ceramic types of materials. The conventional practice in the use of ceramic single point turning tools is that side and back rake angles be negative, to provide more strength at the cutting edge. This is attained by making ceramic inserts as flat disks, i.e. straight-sided cylinders with planar ends. The inserts themselves, as made, have no rake or relief angle. But the portion of the tool holder which receives such inserts is inclined in space, so that effective rake angle of the planar end of the insert is thereby made negative, and so that a relief angle from the straight cylinder wall is provided as well.

However, the aforementioned insert and tool holder combination is not effective when it is desired to do profiling, such as when turning the contoured surface of a shaft, wherein the tool is required to cut not only off its nose but off either side as well. A straight disk insert which is inclined in the tool holder to provide the desired negative rake angle and relief angle at the nose of the holder will provide no relief or rake angle at positions 90° from the nose, i.e. to the right or left, looking down on the top of the insert. Some compromise can be effected with such flat disk inserts by inclining them in a compromise direction, with respect to the points at which cutting will take place, e.g., at 22° from the nose to enable cutting at the nose (0°) at at a 45° point. However, at best non-ideal conditions will be attained and the plane at which the insert contacts the workpiece will vary according to the point around the tool at which contact is made.

Thus, there is a need for an improved design cutting tool for ceramic materials.

DISCLOSURE OF INVENTION

An object of the invention is to provide a tool holder and replaceable insert which are useful for cutting in a multiplicity of directions with even performance.

In accord with the invention an improved cutting tool is comprised of a holder, an insert, and releasable clamping means. The insert has the shape of a tapered cylinder; the diameter increases outwardly along the insert length from a first end to a second end. The first or bottom end is adapted to mate with a portion of the holder, while the opposing or top end has a circular shape with a circumferential edge bevel. The intersection of the edge bevel and the tapered cylinder wall produce a circumferential cutting edge. The cutting edge has at any point around its periphery a negative rake angle provided by the bevel and a relief angle provided by the taper.

In the preferred embodiment both ends of the tool bit are planar. The holder is fitted with a mating planar surface and a socket to engage one end of the insert and the cylindrical sidewall. In another embodiment where the insert is comparatively large, a central hole is provided through which a stud or other fastener passes, to fix the insert in the holder. A still further embodiment utilizes a V-shaped projection at the bottom or first end of the insert; this mates with a V-shaped groove in the holder.

The inventive tool is able to cut with equal performance in any direction around at least a 180° arc centered about the nose of the tool. The insert is relatively simple to fabricate, as is the holder. Different relief and rake angles can be readily achieved in different inserts. By permitting versatile cutting the new tool reduces setups and speeds production.

BRIEF DESCRIPTION OF THE DRAWINGS

FIG. 4 is a side view of an insert clamped in a tool holder.

FIG. 5 is a top view of the assembly in FIG. 4.

FIG. 6 is an end view of the assembly in FIG. 4.

FIG. 7 is a cross-sectional view through an insert retained with a screw.

FIG. 8 is an end view of a tapered bottom insert within a holder.

FIG. 9 is a side view of the assembly shown in FIG. 8.

BEST MODE FOR CARRYING OUT THE INVENTION

The invention is described in terms of its use for profiling the outside diameter of a cylindrical workpiece in a lathe, but it will be apparent that the invention will be useful in many other operations where single point tools are usable. In the discussion which follows it will be assumed that a holder for an insert is disposed so that its axis is perpendicular to both the tangent and long axis of the cylindrical workpiece. The invention will be usable for various brittle ceramic-like insert materials, such as 65% alumina-35% titanium carbide, obtainable as GemPrest GEM 2/3 from Greenleaf Corporation, Saegertown, Pa.

Figure 1:
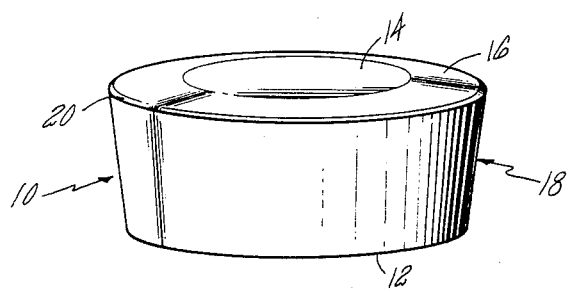
FIG. 1 is a perspective view of the insert of the present invention.
Figure 2:
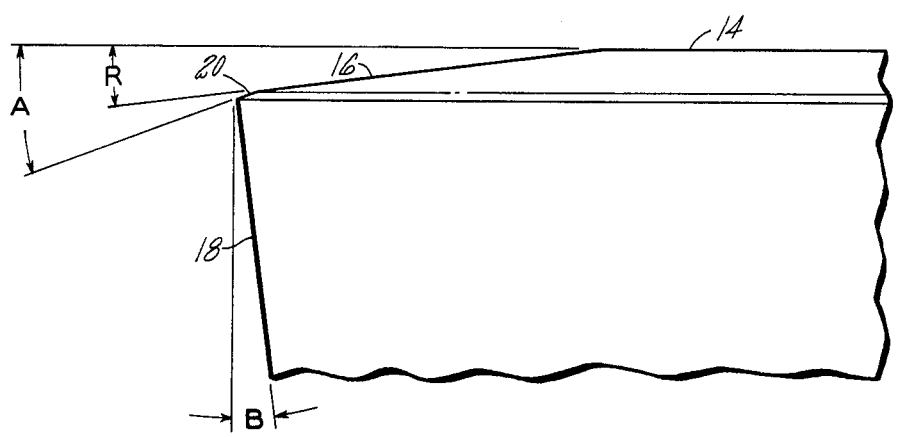
FIG. 2 is a side view showing the cutting edge of the insert in FIG. 1.

The tool of the present invention is comprised of a tool holder, an insert, and means for holding the insert in the tool holder. The principal novelty lies in the combination of the insert and the holder. The insert shown in FIG. 1, is cylindrical in shape, with the sidewall 18 tapering outwardly at an angle B along its length from the first or bottom planar end 12 to the second or top planar end 14. The second end 14 is characterized by a bevel portion 16 around its circumference. The bevel slants outwardly downward toward the first end at an angle R from the planar surface 14, as it approaches the sidewall. FIG. 2 shows in detail the intersection of the bevel with the cylinder sidewall, which forms the circumferential cutting edge.

In application, as disclosed further below, the top planar end 14 is parallel to the axis of the tool holder. Thus the bevel 16 provides a negative rake angle R, while the taper of the cylinder wall 18 provides the relief angle B. It will be seen that this combination of rake and relief angle will exist around the entire periphery of the insert. Thus the tool is adapted to cut in any direction but that required for the support structure of the holder.

The negative rake angle is preferably 7° although it may vary therefrom according to the particular application, in the range 0°–20°. The bevel will extend back toward the center of the end 14 at least a distance equal to the anticipated depth of cut. The relief angle is generally set at the minimum necessary to clear the workpiece; 7° is also preferred here, any may vary at least over the range 4°–10°.

It may be seen in both the Figures that a small chamfer 20, having an angle A from the top plane, preferably about 20°, is desirably imparted to the periphery of the insert where the bevel 16 intersects the sidewall 18. This chamfer serves to produce a somewhat better cutting edge and eliminate small imperfections at the intersection of the bevel and sidewall. An example of a preferred insert is one having a 12.7 mm major diameter, 6.4 mm height, 7° sidewall taper, 7° bevel 2.3 mm long, and a 20° chamfer 0.08 mm long.

Figure 3:
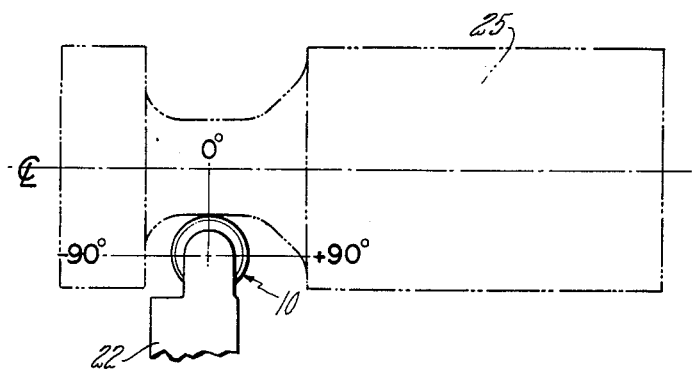
FIG. 3 is a top view of an insert contained in a tool holder when used to turn a workpiece.

Viewed from the top of the insert, as shown in FIG. 3, it may be seen how the insert 10 is retained in a holder 22 in a manner which permits it to cut off the front and 90° to either side, when turning a cylindrical workpiece 25. FIGS. 4–6 further illustrate the retention of the insert in the front end of the holder 22, which has a conventional shank portion 27 holdable in a machine tool. The holder 22 has a portion into which the insert 10 fits. This portion is comprised of a flat surface 26, to absorb vertical forces, and a taper sided socket portion 28, to absorb rearward and lateral forces. Preferably the ceramic insert 10 is seated on a shim 30 of flat ground tungsten carbide-metal material. The use of the shim is convenient in that it avoids the necessity of precise machining of the flat portion 26 of the tool holder, while at the same time providing the necessary full planar support required by the ceramic insert to avoid breakage. The flat surface 26 is parallel to the long axis of the tool holder and in use will be disposed parallel to the plane in which cutting tool feeding takes place. By the design of the insert, the plane in which the cutting edge circumference lies is parallel to the flat surface 26, thus providing all around constant rake and relief angle with respect to a workpiece.

The insert 10 is clamped into the holder by member 32 which presses on the top plane 14 of the insert. Pressure on the clamp 32 is provided by screw 34. Other known clamps and retention system inserts may be used as well. Referring to FIG. 5, it will be seen that the holder portion which contains the socket 28 is shaped in a manner which provides, in the holder shank-direction, angular clearance E at the plus and minus 90° locations of the inserts. That is, the holder portion containing the socket is kept sufficiently narrow so that, most preferably, the most forward point of contact is at least 5° rearward from the 90° locations. This design allows cutting at any point around a 180° arc with uniform performance. Of course, if less than the full 180° arc of cutting capability is not required, the tool holder may be allowed to extend further forward around the insert, to provide even better resistance to lateral movement.

It will be seen that the planar ends of the insert do not comprise critical parts of the cutting surfaces, but function as follows: The first end provides a surface to engage the holder; the second end provides a surface to engage the clamping means. Thus the shapes of the ends are not limited to those within this embodiment, as the following discussion further reveals.

Different retention schemes are feasible. When the size of the insert permits, a hole may be placed in the center of the insert through which a central bolt or pin is passed, as shown in the simple embodiment of FIG. 7. An insert 10A has a central hole through which removable fastener, such as bolt 36 passes, to fasten the insert to the tool holder 22A. Both lateral and vertical movement are prevented. In this approach, consideration is given to differential expansions of the insert and bolt, as well as to mechanical and thermal effects of the central hole. Since such aspects of holes cause potential difficulty, the previously described approach is preferred for small inserts.

FIGS. 8 and 9 show the approach that is preferred when relatively high lateral forces are to be resisted in an insert. The insert 10B has an upper cylindrical shape similar to that of the previously described insert, but added thereto is a tapered V-shaped portion 38, having its length along one of the diameters of the insert. The included angle of this section, designated D, is preferably a 120° angle; other angles may be used as well. The tool holder has an analogous angle C, which is adapted to receive the insert. The angles C and D are nominally the same, except that their respective upper and lower tolerances are adjusted to ensure the insert makes contact at the holder taper rather than contacting the bottom 29 of the insert holder V-groove. The insert is held in the holder 22B by the clamp 32B, similarly to that previously described. Other shapes or interlocking depressions and protuberances may be used, both between the insert and the holder, and the insert and the clamping means. For instance, a small depression may be machined in the top plane 14A of the insert and a dimple provided in the clamp 32B.

Although this invention has been shown and described with respect to a preferred embodiment thereof, it should be understood by those skilled in the art that various changes and omissions in the form and detail thereof may be made therein without departing from the spirit and scope of the invention.

I claim:
1. A cutting tool comprising:
   a holder having a portion adapted for receiving a ceramic insert;
   releasable clamping means attached to the holder, for maintaining the insert in contact with the holder;
   a ceramic insert, engaged with the holder and clamping means, the insert having the shape of a tapered cylinder with the cylinder diameter increasing along the insert length from a first end to a second end, the first insert end adapted to mate with a portion of the holder, the opposing second insert end having a circumferential edge bevel and a chamfer, the intersection of the second insert end and tapered cylinder wall producing a circumferential cutting edge having at any point a compound negative rake angle provided by the chamfer and the bevel, the rake angle of the chamfer being more negative than the rake angle of the bevel, and the insert taper providing a relief angle when the tool is positioned for cutting along the plane in which the circumferential cutting edge lies.

2. The tool of claim 1 wherein the first end is planar and the second end is planar except for the bevel portion.

3. The tool of claim 1 further comprising means to prevent lateral movement of the insert relative to the holder.

4. The tool of claim 3 wherein the means to prevent movement is comprised of an insert surface and a holder surface engaged therewith the surfaces having interacting raised and depressed portions.

5. The tool of claim 3 wherein the insert has a central hole along its cylindrical length through which a central member passes.

* * * * *